N. B. STONE.
HANDLE FOR PIPE CLEANERS AND OTHER ARTICLES.
APPLICATION FILED NOV. 15, 1916.
1,247,168.
Patented Nov. 20, 1917.
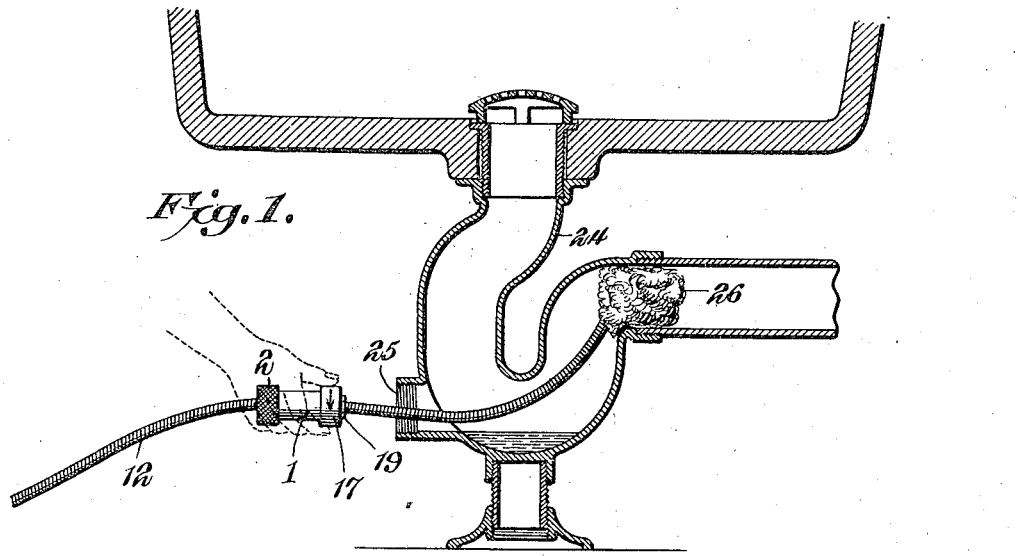
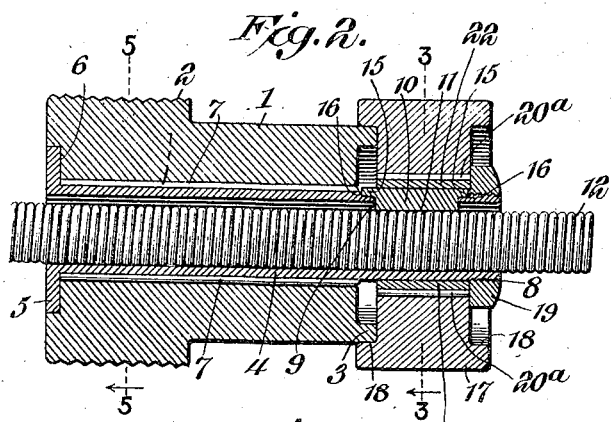
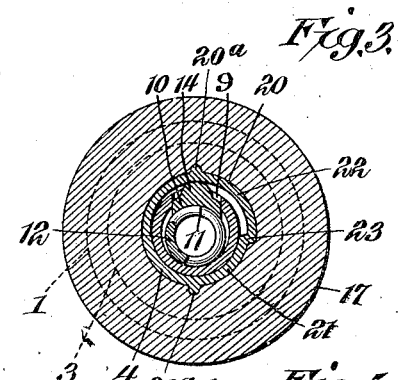
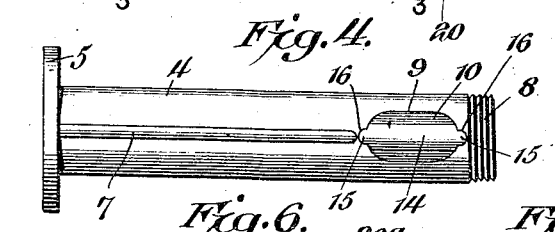
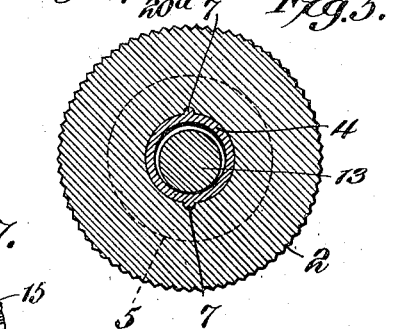
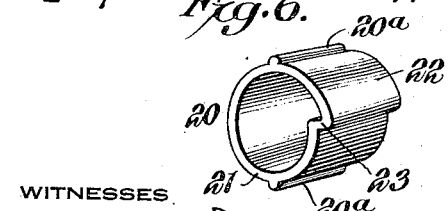
WITNESSES
Howard D. Orr
F. T. Chapman
Nathaniel B. Stone, INVENTOR,
BY E. G. Siggers
ATTORNEY

UNITED STATES PATENT OFFICE.

NATHANIEL B. STONE, OF WASHINGTON, DISTRICT OF COLUMBIA.

HANDLE FOR PIPE-CLEANERS AND OTHER ARTICLES.

1,247,168.  Specification of Letters Patent.  Patented Nov. 20, 1917.

Application filed November 15, 1916. Serial No. 131,608.

*To all whom it may concern:*

Be it known that I, NATHANIEL B. STONE, a citizen of the United States, residing at Washington, District of Columbia, have invented a new and useful Handle for Pipe-Cleaners and other Articles, of which the following is a specification.

This invention has reference to handles for pipe cleaners and other articles, and especially cleaners for traps of plumbing fixtures, but at the same time the handle is suitable for use in connection with rods or shafting or tools where it is desirable to remove and replace or rotate the handle.

Cleaners for plumbing traps are usually made of flexible shafting, and as the shaft is moved into the trap the handle is loosened and drawn along the shaft away from the trap or other pipe permitting the introduction, if needed, of a long length of shafting into the pipe with the handle always in relatively close relation to the trap or pipe.

It is the object of the present invention to so arrange and construct the handle that it may be very quickly loosened from the shafting and as quickly gripped to it without the necessity of employing set screws or other like fastening devices.

In accordance with the present invention the handle is provided with two members, one of which is rotatable with respect to the other, while one of the members contains a gripping element for engaging the shaft with the other member being rotatable and having a cam portion capable of forcing the gripping member into tight engagement with the shaft, but equally capable of quick release by a small fractional turn of a portion of the handle.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a sectional view of a plumbing trap showing a cleaning shaft in operative position and a handle in place on the shaft.

Fig. 2 is a longitudinal diametric section of the handle on a larger scale than Fig. 1 and showing it applied to a flexible shaft.

Fig. 3 is a section on the line 3—3 of Fig. 2.

Fig. 4 is a plan view of a portion of the handle.

Fig. 5 is a section on the line 5—5 of Fig. 2, but indicating a solid shaft instead of a flexible shaft.

Fig. 6 is a perspective view of a tubular cam forming part of the handle.

Fig. 7 is a perspective view of a clamp block or follower forming part of the handle.

Referring to the drawing, and more particularly to Figs. 2 to 7, there is shown a handle member 1 preferably cylindrical and provided at one end with a diametrically enlarged portion 2 to constitute a grip or handhold. That end of the handle 1 remote from the end 2 is provided with a marginal axially extended annular flange 3 for a purpose which will presently appear.

Extending lengthwise through the handle member 1, which is axially bored for the purpose, is a tube 4 having at one end a radial flange 5 seated in a recessed portion 6 in the enlarged end of the handle member 1, and this tube 4 may be provided with longitudinal ribs 7 on opposite sides to seat in the material of the handhold, whereby the tube 4 is prevented from turning independently of the handle member 1. Ordinarily the tube 4 is a metal tube and the handle member 1 is made of wood or other suitable material. The tube 4 is long enough so that when the end flange 5 is seated in the recess 6, the other end of the tube projects some distance beyond the corresponding end of the handle member 1. That end of the tube 4 remote from the flange 5 is formed with screw threads 8 and between the screw threaded portion 8 and the corresponding end of the handle member 1 the tube 4 has a cut-out portion 9 preferably, though not necessarily, elongated and more or less oval, without, however, limitation to such particular shapes. The cut-out 9 is designed to receive a block 10 of corresponding shape with an inner wall 11 curved on a somewhat smaller radius than the inner wall of the tube. The curvature of the wall 11 may correspond approximately to the external curvature of a shaft 12 or 13, as the case may be, to which the handle is to be applied. In the drawings, the shaft 12 is indicated as a flexible shaft of ordinary construction, while the shaft 13 may be a solid round shaft or rod. On the exterior the block 10 has a longitudinal boss 14 with end lugs 15 projecting from the block in the direction of the length of the latter and adapted to seat in recesses 16 in the opposite end walls of the slot or passage 9. The thickness of the block 10 with the boss 14 is sufficient to permit the wall 11 to project some little distance into the bore of the tube 4 when the lugs 15 are seated in the recesses 16. The elongated boss 14 is rounded laterally on a short radius for a purpose which will presently appear.

Adapted to surround that end of the tube 4 containing the block 10 is a cylindrical member 17 corresponding in diameter and length to the enlargement 5, although any strict conformity as to size and shape of these two parts is not obligatory. The block 17 has end recesses 18, there being a recess in each end of the block. These recesses are of such diameter as to readily seat the flange 3 so that the block 17 may be reversed in position with respect to the handle member 1 and in either case the flange 3 will enter a corresponding recess 12, and hold the member 17 from liability of wabbling on the tube 4. A nut 19 applied to the threaded end 8 of the tube 4 serves to hold the member 17 against the handle member 1, but permitting rotation of the member 17 with respect to the handle member 1, as desired.

The member 17 has an inner tubular lining 20 which may be of metal, while the member 17 may be of the same material as the handle member 1. The lining 20 has a cylindrical portion 21 for about half, more or less, of its circumference, while the remainder of the lining 20 is of spirally increasing diameter, as shown at 22, so that one end of the portion 22 is offset radially with relation to the corresponding end of the portion 21 and is joined thereto by a web 23 constituting a shoulder. This structure, together with the ribs 20ª, will prevent any liability of the tube 20 from turning in the handle member 17. The increasing internal diameter of the spiral portion 22 converts that portion of the lining 20 into an internal cam adapted to engage the boss 14. At the deepest portion of the cam the block 10 may have its surface 11 about flush with the inner wall of the tube 4, but at the shallower portion of the cam the block is forced toward the center of the tube 4 to a corresponding extent.

Now, when the shaft 12 or 13, as the case may be, extends through the handle 1, through which it may be readily passed, since the bore of the tube 4 is large enough, the handle may be tightly gripped on the shaft 12 by a twisting movement of the handle member 17 with relation to the handle member 1.

By making the cam 22 of gentle pitch it may be forced against the block 10 by such pressure as to firmly grip the shaft 12 or 13. Still, because of the cam 22, the grip may be as easily loosened intentionally, although accidental loosening of the grip is not at all liable.

In Fig. 1 there is shown a plumbing trap 24 through the clean-out passage 25 of which there is introduced a length of flexible shafting 12 carrying at one end a bunch 26 of waste or other suitable material by means of which the trap 24 and piping beyond it may be cleansed.

The handle 1 is introduced on the shafting 12 while the block 10 is loose and then the handle may be gripped to the shafting by a slight turn of either the member 1 or the member 17 relative one to the other. The shaft 12 may be turned in the proper direction by twisting either handle member so as to tend to tighten the clamp block 10 on to the shaft 12. When the shaft 12 has been introduced into and through the trap 24 so far as the handle will permit, the latter is loosened from the shaft 12 by a slight turn of either of the members 1 or 17 in the proper direction, thus moving the cam 22 from gripping relation to the block 10 and the latter from gripping relation to the shaft 12. Now, the handle member 1 may be adjusted as far away from the trap as needful and again gripped to the shaft 12, after which the latter may be moved farther into the trap and given such twisting motions as are permissible without loosening the handle from the shaft.

There is thus provided a quickly attachable and detachable handle capable of being firmly attached to a shaft or rod by one hand if needful, and so arranged that the more the force exerted upon the handle the tighter it grips the shaft.

Some flexible shafting has its twist in the opposite direction to others. This is provided for in the handle by making the member 17 removable and reversible. Such removability and reversibility is also useful where it is desirable to have either right or left hand turning of the shaft or other member to which the tool is applied.

The block 10 provides an extended gripping surface forcing the shaft 12 or 13 against a more extended gripping surface, thus avoiding any liability of damage to the shaft as might occur were a set screw used to hold the handle to the shaft. Furthermore, the shaft is gripped against any possibility of turning with respect to the handle under the forces applied or on the handle turning on the shaft. The various parts of the device are susceptible of manufacture by molding and stamping so that the whole device may be cheaply constructed and still be effectively resistant to all sorts of strains to which it may be subjected.

The enlargement 2 of the handle member 1 may be exteriorly milled or made of any suitable conformation to distinguish one end of the handle from the other, thus avoiding confusion in applying the handle to the shaft or rod. This is important because the shorter member of the handle should be the forward one for ease of manipulation. Of course, it will be understood that either end of the handle may be milled or otherwise formed to serve as a distinguishing means or the handle may be properly shaped both for gripping purposes and for distinguishing purposes.

What is claimed is:—

1. A handle for attachment and adjustment along rods, shafts, or the like, comprising two handle members with alined passages through them for the shaft, said members being rotatable one with relation to the other about the longitudinal axis of the handle, one member carrying a clamp block adapted to engage a shaft traversing the handle, and the other member having a cam portion engaging the block to force the latter into clamping relation to the shaft when traversing the handle.

2. A handle for shafts, rods, and the like, for longitudinal adjustment thereon, comprising two blocks with one block having an inner sleeve extending lengthwise of the block and also through the second block and having means thereon for holding the second block in rotatable engagement with the first block, said sleeve having a passage therein, a clamp block lodged in the passage, and a cam lining for the second block engaging the clamp block for forcing the clamp block into engagement with a cam or rod traversing the handle on a rotative movement of either the cam carrying handle member or of the other handle member.

3. A handle structure for sliding movement along a shaft, rod or the like, comprising a handle member, a sleeve traversing and fast to the handle member and projecting beyond one end thereof, said sleeve having a side passage through it, a clamp block seated in the passage, another handle member surrounding the portion of the tube carrying the clamp block, and a cam lining sleeve for the second handle member in operative relation to the clamp block for forcing the latter into clamping relation to a shaft or rod traversing the handle by a rotative movement of either handle member.

4. A handle structure for sliding movement along a shaft, rod or the like, comprising a handle member, a sleeve traversing and fast to the handle member and projecting beyond one end thereof, said sleeve having a side passage through it, a clamp block seated in the passage, another handle member surrounding the portion of the tube carrying the clamp block, a cam lining sleeve for the second handle member in operative relation to the clamp block for forcing the latter into clamping relation to a shaft or rod traversing the handle by a rotative movement of either handle member, and means for holding the second handle member in operative relation to the first handle member, the second handle block having terminal recesses and the first handle block being of a diameter adjacent to the second handle block to enter one or the other of the recesses.

5. A handle for application to and adjustment along a shaft or rod or the like, comprising a handle member having a tubular sleeve therethrough and projecting beyond one end of the handle member, said tubular sleeve where projecting beyond the handle member having a longitudinal slot therethrough with terminal recesses, a cam block lodged in the slot and provided with lugs adapted to the recesses, said cam block being of greater thickness than the tube where seated therein, and another handle member on the extension of the tube and provided with an interior cam sleeve adapted to engage the cam block.

6. A handle for adjustment along a shaft or rod or the like, comprising associated handle members rotatable one with respect to the other on the shaft, one of the handle members being provided with a cam block and the other handle member being provided with a cam sleeve for moving the block into engagement with the shaft, and one of said handle members being reversible with respect to the other handle member, whereby the handle may be locked to the shaft by a rotation of one of the handle members with the direction of rotation dependent upon the relation of the reversible handle member to the other member.

In testimony, that I claim the foregoing as my own, I have hereto affixed my signature in the presence of two witnesses.

NATHANIEL B. STONE.

Witnesses:
JOHN H. SIGGERS,
E. G. SIGGERS.

Copies of this patent may be obtained for five cents each, by addressing the "Commissioner of Patents, Washington, D. C."